United States Patent [19]

Seilly et al.

[11] 4,238,698

[45] Dec. 9, 1980

[54] ELECTROMAGNETIC DEVICES

[75] Inventors: Alec H. Seilly, North Wembley; Dorian F. Mowbray, Burnham, both of England

[73] Assignee: Lucas Industries Limited, Birmingham, England

[21] Appl. No.: 899,527

[22] Filed: Apr. 24, 1978

Related U.S. Application Data

[63] Continuation of Ser. No. 682,478, May 3, 1976, abandoned.

[30] Foreign Application Priority Data

Mar. 11, 1976 [GB] United Kingdom ................. 9668/76

[51] Int. Cl.[3] ............................................. H02K 33/00

[52] U.S. Cl. ........................................ 310/27; 310/30; 335/270

[58] Field of Search .................. 335/270, 260; 310/27, 310/30, 15, 80

[56] References Cited

U.S. PATENT DOCUMENTS

| | | | |
|---|---|---|---|
| 3,353,040 | 11/1967 | Abbott | 310/27 |
| 4,003,013 | 1/1977 | Seilly | 335/220 |

*Primary Examiner*—Donovan F. Duggan

[57] ABSTRACT

An electromagnetic device comprises an outer annular member and an inner member, the two members each having a helical rib on their presented surfaces. Two presented side faces of the ribs define working surfaces and on one of the working surfaces is defined a groove which extends the length of the rib and the groove accommodates an electrical winding which when energized creates a pair of magnetic poles on the one working surface. The magnetic circuit of the poles includes the other working surface and the two surfaces move towards each other to reduce the magnetic reluctance thereby causing relative movement of the members.

10 Claims, 4 Drawing Figures

ELECTROMAGNETIC DEVICES

This is a continuation of application Ser. No. 682,478, filed May 3, 1976 now abandoned.

This invention relates to electromagnetic devices of the kind comprising a pair of relatively movable members one of which is of annular form and surrounds the other member, said members defining opposed substantially cylindrical spaced surfaces and an electrical conductor which when supplied with electric current causes relative movement of the members.

The object of the invention is to provide such a device in a simple and convenient form.

According to the invention a device of the kind specified comprises a pair of helical magnetizable elements on said surfaces respectively, each of said elements defining a working surface facing the working surface of the other element, a groove formed in one of said working surfaces said groove accommodating an electrical conductor whereby when the conductor is energised said one working surface will form a pair of magnetic poles and the two members will move relative to each other so as to reduce the reluctance of the magnetic circuit formed between said poles and including the other working surface.

Examples of electromagnetic devices in accordance with the invention will now be described with reference to the accompanying drawings 1–4 of which show different examples, each figure being a sectional side elevation of the device.

Figure 1:
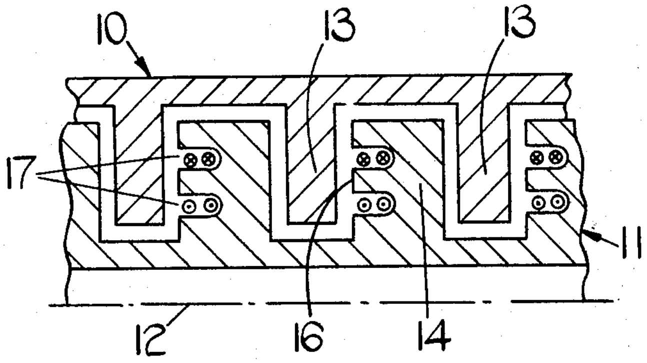

With reference to FIG. 1, the device comprises a pair of members 10, 11. In the example both members are of annular form with the member 10 being outermost and the centre line or axis of the device is indicated at 12. The member 11 need not be of annular form but can be solid. The inner surface of the outer member 10 is in spaced relationship to the outer surface of the inner member 11.

Formed on the aforesaid surfaces of the members are a pair of helical elements in the form of ribs 13, 14 respectively, and the groove defined between adjacent turns of each rib is such that the other rib can be positioned therein and will allow relative axial movement of the members. The elements are formed from magnetizable material and in the particular example so also are the members. Conveniently the member 11 is axially fixed to a mounting not shown and the other member is secured to some mechanisms (not shown) which is to be actuated.

Each rib defines a working surface which is presented to the working surface of the other rib. In the example the working surface on the rib 13 is referenced 15 and that on the rib 14 is referenced 16. In the example of FIG. 1 the working surfaces 15, 16 extend in a direction normal to the axis 12.

The working surface 16 is provided with a pair of radially spaced grooves 17 and these extend the whole length of the rib. The grooves 17 accommodate an electrical winding which as shown has two turns. The winding is wound by winding the conductor along say the outer groove from one end of the device and returning along the inner groove and repeating this process as often as required. When electric current is caused to flow through the winding the directions of current flow in the conductor in for example the outer slot 17 are the same and in the opposite direction to those in the inner slot 17. There will therefore be induced on the working surface 16 three magnetic poles, one the central one, being of the opposite polarity to the other two.

It will be appreciated that the poles extend throughout the length of the rib. The magnetic circuits between the central and the inner and the central and the outer pole include the working surface 15 on the rib 13 and the ribs and therefore the member 10 will move in a direction to reduce the air gap between the working surfaces by movement towards the right as seen in the drawing. As such movement takes place the reluctance of the magnetic circuits is reduced. As shown the radial dimension between the grooves 17 is substantially equal to half the remaining working surface. The dimension between the grooves in practice would be more than half because of the higher flux in the central pole.

Figure 2:
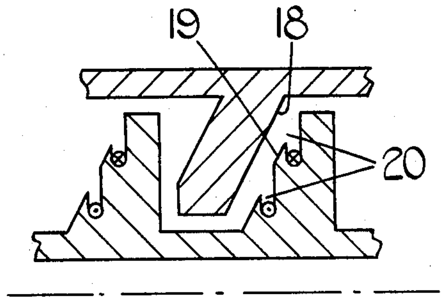

One problem with the example of FIG. 1 is the location of the winding in the slots 17. This is because the slots extend in a direction substantially parallel to the axis of the device. The difficulty is overcome as shown in FIG. 2 by shaping the ribs in such a manner that the working surfaces 18, 19 are inclined to the normal to the axis. The grooves 20 can then be machined so that they extend radially thereby facilitating the winding operation. The operation of the device is exactly as described with reference to FIG. 1.

Whilst two grooves 17, 20 have been shown in FIGS. 1 and 2 a single groove may be employed. In this case if the winding has more than one turn the return portions of the winding must pass along some other route to the end of the groove so as to ensure that in the portions of the winding in the groove the direction of current flow is the same. With one groove in the working surface it will be understood that only two magnetic poles of opposite polarity will be induced.

In the arrangements of FIGS. 1 and 2 the direction of movement of the member 10 when the winding is energised will be towards the right and the extent of movement will be determined either by physical abutment of the working surfaces or by an external stop. The movement of the member in the opposite direction is provided by for example resilient means which may in fact be an integral part of the mechanism which is to be actuated.

Figure 3:
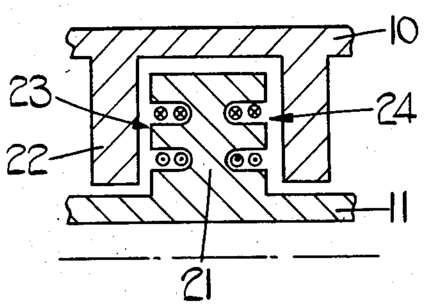

One way of obtaining positive movement in one or the other direction is to use the arrangement of FIG. 3. In this example both side faces of the rib 21 on the member 11 form working surfaces. Each working surface has a pair of grooves which accommodate a winding in the manner described with reference to FIG. 1. Therefore depending on which winding is energised the movement of the member 10 will be towards the left or towards the right from the position seen in FIG. 3.

Figure 4:
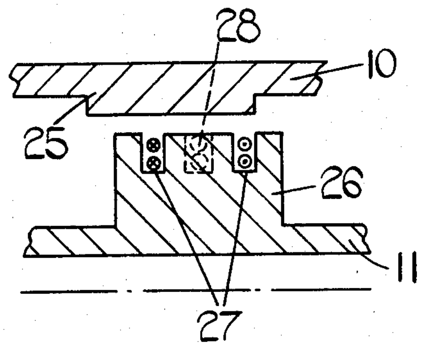

In the examples described the spacing between the working surfaces reduces as the two members move relative to each other thereby reducing the reluctance of the magnetic circuit or circuits. In the example shown in FIG. 4 the distance between the working surfaces remains the same however the area of the air gap increases to reduce the reluctance. With reference to FIG. 4. The member 10 is provided with a helical rib 25 and the member 11 with a helical rib 26. The radially inner and outer faces of the ribs constitute the working surfaces.

Formed in the working surface of the rib 26 is a pair of grooves 27 which accommodate portions of the electical winding which is wound in the same manner as the winding of FIG. 2. When the winding is supplied with electric current three magnetic poles will be induced and the two ribs will be drawn into alignment thereby causing movement of the member 10. The action of drawing the ribs into alignment reduces the reluctance of the magnetic circuit between one pair of poles, by increasing the area of the air gap. If desired the two grooves may be replaced by a single central groove shown in dotted outline at 28 and in this case if more than one turn is provided for the winding, the return portion of the winding must follow some other route. Moreover, in both arrangements care must be taken with the axial length of the ribs and the initial relative axial position of the ribs to ensure that the desired movement does take place.

We claim:

1. An electromagnetic device comprising a pair of relatively movable members one of which is of annular form and surrounds the other member, said members defining opposed substantially cylindrical surface, a single helical magnetizable element on each of said surfaces respectively, each of said elements defining a working surface facing the working surface of the other element a groove formed in one working surface and an electrical conductor accommodated in said groove whereby when said conductor is energised said one working surface will form a pair of magnetic poles and the two members will move relative to each other in one direction so as to reduce the reluctance of the magnetic circuit formed between said poles and including the other working surface.

2. A device according to claim 1 including a pair of grooves in said one working surface and a conductor in each of said grooves, said conductors forming an electrical winding extending from one end of the device along one groove and returning to said one end of the device along the other groove.

3. A device according to claim 1 in which the groove accommodates a plurality of conductors, the current flow in the conductors in said groove being in the same direction.

4. A device according to claim 1 in which said working surfaces extend substantially normal to the axis of the device.

5. A device according to claim 4 in which the groove extends substantially parallel to said axis.

6. A device according to claim 4 in which the element which defines said one working surface also defines a further working surface having a further groove locating a further conductor, whereby energisation of the further conductor will affect relative movement of the members in the opposite direction.

7. A device according to claim 1 in which said working surfaces are inclined relative to the normal to the axis of the device.

8. A device according to claim 7 in which said groove extends substantially normal to said axis.

9. A device according to claim 1 in which said working surfaces extends substantially parallel to the axis of the device, said groove extending substantially normal to the axis of the device.

10. A device according to claim 1 in which said one working surface is defined by the element on said other member.

* * * * *